United States Patent
Kim et al.

(10) Patent No.: US 11,002,886 B2
(45) Date of Patent: May 11, 2021

(54) POLARIZER PROTECTION FILM, POLARIZING PLATE INCLUDING SAME, AND LIQUID CRYSTAL DISPLAY DEVICE INCLUDING POLARIZING PLATE

(71) Applicant: SAMSUNG SDI CO., LTD., Yongin-si (KR)

(72) Inventors: Ran Kim, Suwon-si (KR); So Hee Yu, Suwon-si (KR); Seung Kyu Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/096,648

(22) PCT Filed: Dec. 23, 2016

(86) PCT No.: PCT/KR2016/015168
§ 371 (c)(1),
(2) Date: Oct. 25, 2018

(87) PCT Pub. No.: WO2017/188552
PCT Pub. Date: Nov. 2, 2017

(65) Prior Publication Data
US 2019/0154884 A1    May 23, 2019

(30) Foreign Application Priority Data
Apr. 25, 2016    (KR) .................. 10-2016-0050053

(51) Int. Cl.
*G02B 1/14*    (2015.01)
*B32B 7/12*    (2006.01)
(Continued)

(52) U.S. Cl.
CPC .......... *G02B 1/14* (2015.01); *B29D 11/00644* (2013.01); *B32B 7/02* (2013.01);
(Continued)

(58) Field of Classification Search
CPC .......... B32B 27/08; B32B 7/02; B32B 27/36; B32B 27/306; B32B 7/12;
(Continued)

(56) References Cited

U.S. PATENT DOCUMENTS 4,423,185 A * 12/1983 Matsumoto ............. B32B 27/06
                                                               525/66
5,686,194 A * 11/1997 Shimizu .................. B32B 15/08
                                                               428/626
(Continued)

FOREIGN PATENT DOCUMENTS

CN          1564841 A       1/2005
CN          102081254 A     6/2011
(Continued)

OTHER PUBLICATIONS

Chinese Office Action dated May 27, 2020, for corresponding Chinese Patent Application No. 201680084900.6 (7 pages).

*Primary Examiner* — Hoan C Nguyen
(74) *Attorney, Agent, or Firm* — Lewis Roca Rothgerber Christie LLP (57) ABSTRACT

Provided are a polarizer protection film, a polarizing plate comprising the same, and a liquid crystal display device comprising the polarizing plate. The polarizer protection film has: a moisture permeability ranging from approximately 0 g/m²/24 hr to approximately 100 g/m²/24 hr; a value for a MD-direction shrinkage rate/a TD-direction shrinkage rate, ranging from 0.8 to 1.3; an in-plane phase difference (Re) ranging from approximately 0 nm to approximately 350 nm; a thickness-direction phase difference (Rth) ranging from approximately 2500 nm to approximately 8000 nm; and a thickness of approximately 10 μm to approximately 60 μm.

19 Claims, 2 Drawing Sheets

(51) Int. Cl.
  *B32B 27/36* (2006.01)
  *B29D 11/00* (2006.01)
  *B32B 7/02* (2019.01)
  *G02B 5/30* (2006.01)
  *B32B 27/08* (2006.01)
  *B32B 27/30* (2006.01)
  *G02F 1/1335* (2006.01)

(52) U.S. Cl.
  CPC ............... *B32B 7/12* (2013.01); *B32B 27/08* (2013.01); *B32B 27/306* (2013.01); *B32B 27/36* (2013.01); *G02B 5/30* (2013.01); *G02F 1/133528* (2013.01); *B32B 2307/7265* (2013.01); *G02F 2201/50* (2013.01); *G02F 2201/54* (2013.01)

(58) Field of Classification Search
  CPC .......... B32B 2307/7265; G02B 5/3033; G02B 5/3083; G02B 5/30; G02B 1/14; B29D 11/00644; G02F 1/133528; G02F 2201/50; G02F 2201/05
  See application file for complete search history.

(56) References Cited

U.S. PATENT DOCUMENTS

| | | | | |
|---|---|---|---|---|
| 2004/0213981 | A1* | 10/2004 | Clark | B29C 55/005 428/304.4 |
| 2006/0057405 | A1* | 3/2006 | Kagawa | B32B 37/203 428/458 |
| 2007/0211199 | A1* | 9/2007 | Kobayashi | G02F 1/133634 349/117 |
| 2010/0080940 | A1* | 4/2010 | Godey | B29C 43/222 428/32.18 |
| 2010/0215902 | A1* | 8/2010 | Kiehne | B32B 17/10788 428/141 |
| 2010/0272975 | A1* | 10/2010 | Jerdee | B29C 48/917 428/215 |
| 2011/0128477 | A1* | 6/2011 | Izaki | G02B 5/3083 349/96 |
| 2012/0227801 | A1* | 9/2012 | Brennan | C08J 5/18 136/256 |
| 2013/0327396 | A1* | 12/2013 | Akaike | B32B 7/12 136/256 |
| 2014/0087107 | A1* | 3/2014 | Kim | C23C 14/20 428/35.7 |
| 2014/0373914 | A1* | 12/2014 | Ninomiya | H01L 31/049 136/256 |
| 2015/0062502 | A1* | 3/2015 | Saneto | G02B 1/105 349/96 |
| 2015/0131038 | A1* | 5/2015 | Ishiguro | G02F 1/133528 349/96 |
| 2016/0308170 | A1* | 10/2016 | Kim | H01L 51/5281 |

FOREIGN PATENT DOCUMENTS

| | | | |
|---|---|---|---|
| CN | 104285169 A | | 1/2015 |
| JP | 02039998 A | * | 2/1990 |
| JP | 2000094513 A | * | 4/2000 |
| KR | 10-2006-0046047 A | | 5/2006 |
| KR | 10-2006-0050706 A | | 5/2006 |
| KR | 10-2010-0102292 A | | 9/2010 |
| KR | 10-2014-0094092 A | | 7/2014 |
| KR | 10-2015-0037439 A | | 4/2015 |
| KR | 10-2015-0043641 A | | 4/2015 |
| KR | 10-2015-0046809 A | | 5/2015 |

\* cited by examiner

POLARIZER PROTECTION FILM, POLARIZING PLATE INCLUDING SAME, AND LIQUID CRYSTAL DISPLAY DEVICE INCLUDING POLARIZING PLATE

CROSS-REFERENCE TO RELATED APPLICATION(S)

This application is a National Phase Patent Application and claims priority to and the benefit of International Application Number PCT/KR2016/015168, filed on Dec. 23, 2016, which claims priority to and the benefit of Korean Patent Application No. 10-2016-0050053, filed on Apr. 25, 2016, the entire contents of each of which are incorporated herein by reference.

TECHNICAL FIELD

The present invention relates to a protective film for polarizer, a polarizing plate including the same, and a liquid crystal display including the same.

BACKGROUND

In a liquid crystal display or an organic light emitting device, transmitted light is optically modulated in response to an input image signal, or spontaneous emission of luminance pixels corresponding to an image signal is performed, thereby obtaining gradation for each pixel. A layer for modulating transmitted light or luminance for each pixel is referred to as a modulation layer. In a liquid crystal display, a liquid crystal layer corresponds to the modulation layer, and in an organic light emitting device, an organic EL (electroluminescence) light emitting layer corresponds to the modulation layer.

Since the liquid crystal layer is not a light valve that completely blocks light, a liquid crystal display includes polarizing plates disposed on both sides thereof in a vertical direction, that is, on a backlight side and on a viewing side of a viewer.

Since a light emitting layer of an organic light emitting device does not emit light when no voltage is applied, the organic light emitting device can display a full black color and provide higher contrast than a liquid crystal display. Thus, the organic light emitting device does not include a polarizing plate for shielding light emission. However, in the organic light emitting device, external light can be reflected by a metal interconnect therein, causing reduction in contrast. In order to prevent this problem, a polarizing plate may be provided to the organic light emitting device.

A polarizer or a protective film for the same constituting a polarizing plate may be manufactured through stretching and can have a contraction force to return to the state before stretching due to penetration of moisture or the like, causing warpage of a display such as a liquid crystal display or an organic light emitting device. Therefore, studies are being made on a protective film for polarizer or a polarizing plate which can prevent warpage of a display.

SUMMARY

It is one object of the present invention to provide a protective film for polarizer which has thin thickness and has low water vapor transmission rate, thereby suppressing warpage of a display at high temperature or at high temperature and high humidity, and a polarizing plate including the same.

It is another object of the present invention to provide a liquid crystal display which includes the polarizing plate as set forth above and thus can be prevented from being warped.

The present invention is not limited to the above objects, and the above and other objects of the present invention will become apparent to those skilled in the art from the detailed description of the invention.

In accordance with one aspect of the present invention, a protective film for polarizer has a water vapor transmission rate (a moisture permeability) of about 0 g/m²/24 hr to about 100 g/m²/24 hr; a ratio of shrinkage in the MD to shrinkage in the TD (a value for a MD-direction shrinkage rate/a TD-direction shrinkage rate) of about 0.8 to about 1.3; an in-plane retardation Re of about 0 nm to about 350 nm; an out-of-plane retardation Rth of about 2,500 nm to about 8,000 nm; and a thickness of about 10 μm to about 60 μm.

The protective film for polarizer may include polyester-based material.

The protective film for polarizer may include a polyethylene terephthalate resin, a polyethylene naphthalate resin, or a copolymer thereof.

The protective film for polarizer may have a triple co-extruded structure including the polyethylene terephthalate resin, the polyethylene naphthalate resin, or the copolymer thereof.

In accordance with another aspect of the present invention, a polarizing plate includes: a polarizer comprising a polyvinyl alcohol resin; and a protective film for polarizer stacked on at least one surface of the polarizer, wherein the protective film for polarizer has a water vapor transmission rate of about 0 g/m²/24 hr to about 100 g/m²/24 hr; a ratio of shrinkage in the MD to shrinkage in the TD of about 0.8 to about 1.3; an in-plane retardation Re of about 0 nm to about 350 nm; an out-of-plane retardation Rth of about 2,500 nm to about 8,000 nm; and a thickness of about 10 μm to about 60 μm.

The protective film for polarizer may include polyester-based material.

The protective film for polarizer may include a polyethylene terephthalate resin, a polyethylene naphthalate resin, or a copolymer thereof.

The protective film for polarizer may have a triple co-extruded structure including the polyethylene terephthalate resin, the polyethylene naphthalate resin, and the copolymer thereof.

The polarizing plate may further include a functional layer disposed on one surface of the protective film for polarizer, wherein the functional layer includes at least one of a hard-coating layer, an anti-reflection layer, an anti-glare layer, and a diffusion layer.

In accordance with a further aspect of the present invention, a liquid crystal display includes: a liquid crystal cell; a backlight unit; a lower polarizing plate interposed between the liquid crystal cell and the backlight unit; and an upper polarizing plate disposed on a viewer side of the liquid crystal cell, wherein at least one of the upper polarizing plate and the lower polarizing plate includes the protective film for polarizer as set forth above.

The liquid crystal display may further include a functional layer disposed on one surface of the protective film for polarizer, wherein the functional layer includes at least one of a hard-coating layer, an anti-reflection layer, an anti-glare layer, and a diffusion layer.

The functional layer may be disposed on the protective film for polarizer of the upper polarizing plate.

The functional layer may be disposed on a viewer side of the protective film for polarizer.

Other details of embodiments are illustrated in the detailed description and drawings.

In aspects of the present invention, provide advantageous effects as below.

A protective film for polarizer of the present invention and a polarizing plate including the protective film can be suppressing warpage of a display by having low water vapor transmission rate.

And, a display can be suppressing warpage at high temperature or at high temperature and high humidity, by including the polarizing plate.

The present invention is not limited to the above objects, and the above and other objects of the present invention will become apparent to those skilled in the art from the detailed description of the invention.

DETAILED DESCRIPTION

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and thorough understanding of the present invention by those skilled in the art. The scope of the present invention is defined only by the claims.

When an element or layer is referred to as being "on," "connected to," or "coupled to" another element or layer, it may be directly on, connected to, or coupled to the other element or layer or intervening elements or layers may be present. Like components will be denoted by like reference numerals throughout the specification.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

In addition, unless otherwise stated herein, steps constituting a manufacturing method described herein are not limited to a sequence stated in the specification. Therefore, the sequence of the steps involved in the manufacturing method can be changed within the scope capable of being easily understood by those skilled in the art, and various changes or modifications apparent to those skilled in the art can be made without departing from the scope of the invention.

As used herein, an in-plane retardation Re and an out-of-plane retardation Rth mean values measured at a wavelength of 550 nm.

Protective Film for Polarizer

Figure 1:
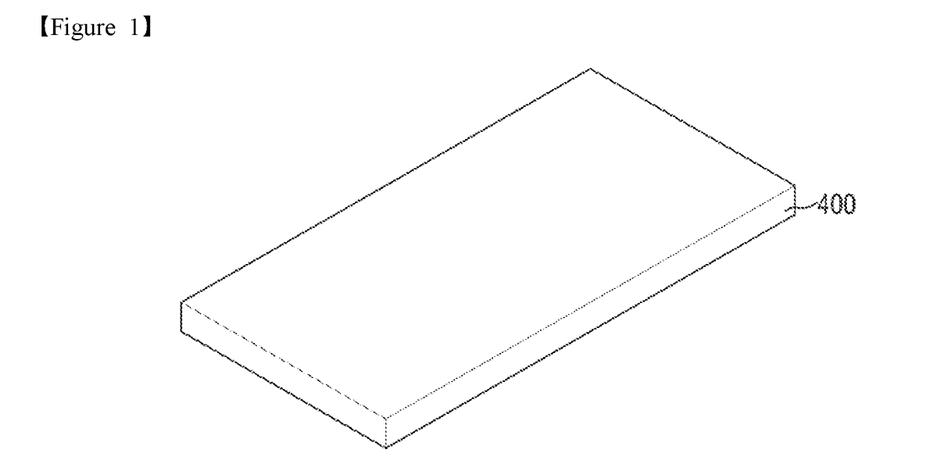
FIG. 1 is a perspective view of a protective film for polarizer according to one embodiment of the present invention.

FIG. 1 is a perspective sectional view of a protective film for polarizer according to one embodiment of the present invention. Referring to FIG. 1, the protective film for polarizer 400 has a water vapor transmission rate (a moisture permeability) of about 0 $g/m^2/24$ hr to about 100 $g/m^2/24$ hr, a ratio of shrinkage in the MD (machine direction) to shrinkage in the TD (transverse direction) (identical to a value for a MD-direction shrinkage rate/a TD-direction shrinkage rate) of about 0.8 to about 1.3, an in-plane retardation Re of about 0 nm to about 350 nm, an out-of-plane retardation Rth of about 2500 nm or more, and a thickness of about 10 μm to about 60 μm.

The protective film for polarizer 400 may have a water vapor transmission rate of about 0 $g/m^2/24$ hr to about 100 $g/m^2/24$ hr, or about 10 $g/m^2/24$ hr to about 80 $g/m^2/24$ hr, or about 10 $g/m^2/24$ hr to about 50 $g/m^2/24$ hr, for example, about 0 $g/m^2/24$ hr, 5 $g/m^2/24$ hr, 10 $g/m^2/24$ hr, 15 $g/m^2/24$ hr, 20 $g/m^2/24$ hr, 25 $g/m^2/24$ hr, 30 $g/m^2/24$ hr, 35 $g/m^2/24$ hr, 40 $g/m^2/24$ hr, 45 $g/m^2/24$ hr, 50 $g/m^2/24$ hr, 55 $g/m^2/24$ hr, 60 $g/m^2/24$ hr, 65 $g/m^2/24$ hr, 70 $g/m^2/24$ hr, 75 $g/m^2/24$ hr, 80 $g/m^2/24$ hr, 85 $g/m^2/24$ hr, 90 $g/m^2/24$ hr, 95 $g/m^2/24$ hr, or 100 $g/m^2/24$ hr. Within this range, it is possible to minimize penetration of moisture into a polarizing plate through the protective film for polarizer and to prevent the protective film for polarizer and the polarizing plate including the protective film for polarizer from being warped at high temperature or at high temperature and high humidity.

The protective film for polarizer 400 may have a ratio of shrinkage in the MD (machine direction) to shrinkage in the TD (transverse direction) (a value for a MD-direction shrinkage rate/a TD-direction shrinkage rate) of about 0.8 to about 1.3, for example, about 0.9 to about 1.1, for example, about 0.8, 0.9, 1.0, 1.1, 1.2, or 1.3. Within this range, it is possible to minimize a difference between shrinkage in the MD and shrinkage in the TD, thereby preventing the protective film for polarizer from shrinking in a specific direction and preventing the protective film for polarizer from being warped in a specific direction even in the event where the protective film for polarizer is warped due to moisture penetration. That is, contraction forces generated in the MD and the TD can be offset from each other.

As used herein, the "ratio of shrinkage in the MD to shrinkage in the TD (a value for a MD-direction shrinkage rate/a TD-direction shrinkage rate)" refers to a value found by dividing the shrinkage rate in the MD by the shrinkage rate in the TD.

In order to control the ratio of shrinkage in the MD to shrinkage in the TD, the protective film for polarizer may be stretched to substantially the same elongation in the MD and TD directions during manufacture of the protective film for polarizer.

The protective film for polarizer 400 may have an in-plane retardation Re of about 0 nm to about 350 nm, for example, about 0 nm, 10 nm, 20 nm, 30 nm, 40 nm, 50 nm, 60 nm, 70 nm, 80 nm, 90 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, or 350 nm and an out-of-plane retardation Rth of about 2500 nm or more. When the thickness of the protective film for polarizer 400 is defined as d, the refractive index in an in-plane slow-axis direction is defined as $n_x$, the refractive index in an in-plane fast-axis direction is defined as $n_y$, and the refractive index in a thickness direction is defined as $n_z$, the in-plane retardation Re and the out-of-plane retardation Rth may be defined by the following equations, respectively.

$$Re = (n_x - n_y) \times d$$

$$Rth = ((n_x + n_y)/2 - n_z) \times d$$

In addition, the retardation values are absolute values and may be defined as positive values.

The slow axis may be defined as a direction in which the in-plane refractive index of the protective film for polarizer 400 has the maximum value, and the fast axis may be defined as a direction perpendicular to the slow axis in the plane.

Generally, assuming that the fast axis of the protective film for polarizer 400 is Θr and the absorption axis thereof is Θp, when Θr–p is not 90° or 0°, that is, when the slow axis r of the protective film for polarizer 400 is not perpendicular or parallel to the absorption axis p of the polarizer, rainbow spots are visually recognized by the influence of retardation/birefringence. When the protective film for polarizer according to the present invention is placed at an end in a viewer direction, rainbow spots may not be visible, regardless of a value of Θr–p.

In an exemplary embodiment, for the above reasons, the in-plane retardation Re may range from about 0 nm to about 350 nm or about 100 nm to 350 nm. In addition, the out-of-plane retardation Rth may range from about 2,500 nm to about 8,000 nm or about 5,000 nm to about 7,000 nm, for example, about 2,500 nm, 2,600 nm, 2,700 nm, 2,800 nm, 2,900 nm, 3,000 nm, 3,100 nm, 3,200 nm, 3,300 nm, 3,400 nm, 3,500 nm, 3,600 nm, 3,700 nm, 3,800 nm, 3,900 nm, 4,000 nm, 4,100 nm, 4,200 nm, 4,300 nm, 4,400 nm, 4,500 nm, 4,600 nm, 4,700 nm, 4,800 nm, 4,900 nm, 5,000 nm, 5,100 nm, 5,200 nm, 5,300 nm, 5,400 nm, 5,500 nm, 5,600 nm, 5,700 nm, 5,800 nm, 5,900 nm, 6,000 nm, 6,100 nm, 6,200 nm, 6,300 nm, 6,400 nm, 6,500 nm, 6,600 nm, 6,700 nm, 6,800 nm, 6,900 nm, 7,000 nm, 7,100 nm, 7,200 nm, 7,300 nm, 7,400 nm, 7,500 nm, 7,600 nm, 7,700 nm, 7,800 nm, 7,900 nm, or 8,000 nm.

The protective film for polarizer 400 may have a thickness of about 10 μm to about 60 μm in order to achieve thickness reduction. When the water vapor transmission rate range as described above is satisfied while reducing the thickness of the protective film for polarizer 400, it is possible to minimize warpage of the protective film for polarizer 400.

The protective film for polarizer 400 may include polyester-based material.

Examples of the polyester-based material may include: dicarboxylic acids such as terephthalic acid, isophthalic acid, orthophthalic acid, 2,5-naphthalene dicarboxylic acid, 2,6-naphthalene dicarboxylic acid, 1,4-naphthalene dicarboxylic acid, 1,5-naphthalene dicarboxylic acid, diphenyl carboxylic acid, diphenoxyethane dicarboxylic acid, diphenylsulfone carboxylic acid, anthracene dicarboxylic acid, 1,3-cyclopentane dicarboxylic acid, 1,3-cyclohexane dicarboxylic acid, 1,4-cyclohexane dicarboxylic acid, hexahydroterephthalic acid, hexahydroisophthalic acid, malonic acid, dimethyl malonic acid, succinic acid, 3,3-diethyl succinic acid, glutaric acid, 2,2-dimethylglutaric acid, adipic acid, 2-methyladipic acid, trimethyladipic acid, pimelic acid, azelaic acid, dimer acid, sebacic acid, suberic acid, and dodeca dicarboxylic acid; and diols such as ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1,6-hexanediol, 2,2-bis(4-hydroxyphenyl) propane, and bis(4-hydroxyphenyl)sulfone, without being limited thereto.

For example, the protective film for polarizer may include a polyester resin selected from homopolymers obtained by polycondensation of any one of the above materials, copolymers obtained by polycondensation of at least one of the dicarboxylic acids and at least two of the diols, copolymers obtained by polycondensation of at least two of the dicarboxylic acids and at least one of the diols, and blend resins obtained by blending at least two of the homopolymers or copolymers.

In an exemplary embodiment, in view of crystallinity of polyesters, the polyester-based material may be an aromatic polyester, for example, a polyethylene terephthalate (PET) resin, a polyethylene naphthalate (PEN) resin, or a copolymer thereof, without being limited thereto.

In addition, the protective film for polarizer 400 may have a triple co-extruded structure including a polyethylene terephthalate resin, a polyethylene naphthalate resin, or a copolymer resin thereof.

For example, the protective film for polarizer is obtained by melt-extruding the aforementioned polyester resin into a film form, followed by cooling and solidification using a casting drum.

The protective film for polarizer 400 is biaxially stretched and, more specifically, stretched in the MD and the TD. In addition, as described above, an MD elongation of the protective film for polarizer 400 may be substantially the same as a TD elongation of the protective film for polarizer 400. As a result, shrinkage of the protective film for polarizer in each direction can be controlled. The protective film for polarizer 400 may be stretched in the MD to an elongation of about 3.0 to about 3.5 and may be stretched in the TD to an elongation of about 2.5 to about 4.5.

Here, stretching of the protective film for polarizer may be performed by any typical stretching method such as longitudinal and transverse sequential biaxial stretching, longitudinal and transverse simultaneous biaxial stretching, or the like. In an exemplary embodiment, the stretching may be performed by simultaneous biaxial stretching, without being limited thereto. In addition, the stretching may be performed using any suitable stretcher such as a roll stretcher, a tenter stretcher, or a pantograph or linear motor type biaxial stretcher, without being limited thereto.

Polarizing Plate

Figure 2:
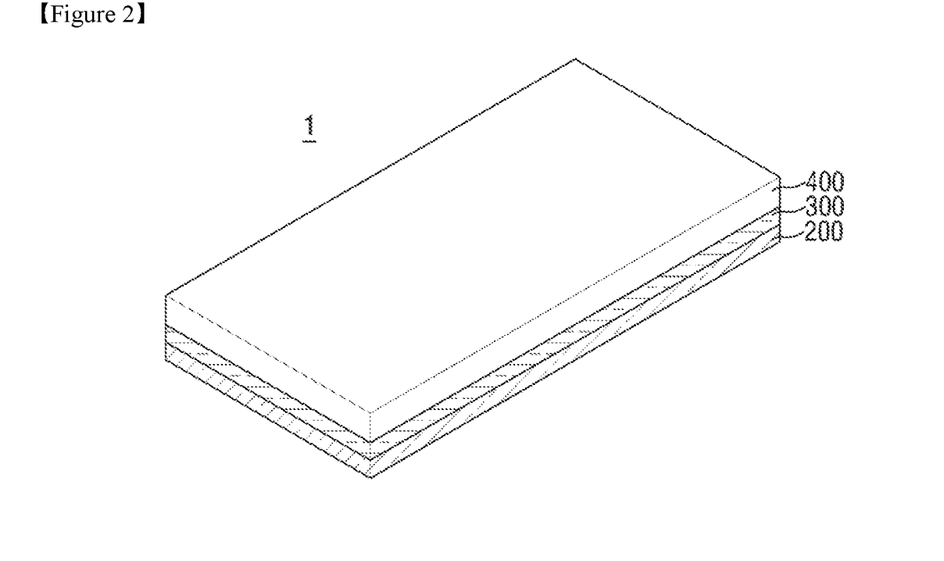
FIG. 2 is a perspective view of a polarizing plate according to one embodiment of the present invention.

FIG. 2 is a perspective view of a polarizing plate according to one embodiment of the present invention. Referring to FIG. 2, the polarizing plate 1 includes a polarizer 200 including a polyvinyl alcohol resin and a protective film for polarizer 400 stacked on at least one surface of the polarizer 200, wherein the protective film for polarizer 400 is the protective film for polarizer as set forth above. That is, the protective film for polarizer 400 has a water vapor transmission rate of about 0 g/m²/24 hr to about 100 g/m²/24 hr, a ratio of shrinkage in the MD to shrinkage in the TD of about 0.8 to about 1.3, an in-plane retardation Re of about 0 nm to about 350 nm, an out-of-plane retardation Rth of about 2500 nm or more, and a thickness of about 10 μm to about 60 μm.

The polarizer 200 is a film which can convert natural light or polarized light into arbitrary polarized light, generally, specific linearly-polarized light. Examples of the polarizer 200 may include: a film obtained by adsorbing a dichroic substance such as iodine or dichroic dyes to a hydrophilic polymer film, such as a polyvinyl alcohol film, a partially formalized polyvinyl alcohol film, or an ethylene-vinyl acetate copolymer-based partially saponified film, followed by stretching; and a polyene-based oriented film such as a dehydrated product of polyvinyl alcohol or a dehydrochlorinated product of polyvinyl chloride, without being limited thereto. In an exemplary embodiment, the polarizer may be an iodine-containing polyvinyl alcohol film, which can have a high degree of polarization and exhibits excellent adhesion to the protective film for polarizer 400, without being limited thereto.

A bonding layer 300 is interposed between the polarizer 200 and the protective film for polarizer 400 to attach the polarizer 200 to the protective film for polarizer 400. Although the bonding layer 300 may include a water-based bonding agent, it should be understood that the present invention is not limited thereto and the bonding layer may include a UV curable bonding agent.

The water-based bonding agent may include at least one selected from the group consisting of a polyvinyl alcohol resin and a vinyl acetate resin, or may include a polyvinyl alcohol resin having a hydroxyl group, without being limited thereto.

In addition, the UV curable bonding agent may include an acrylic compound and may be, for example, an acrylic bonding agent, a urethane-acryl-based bonding agent, or an epoxy-based bonding agent. However, the present invention is not limited thereto.

Figure 3:
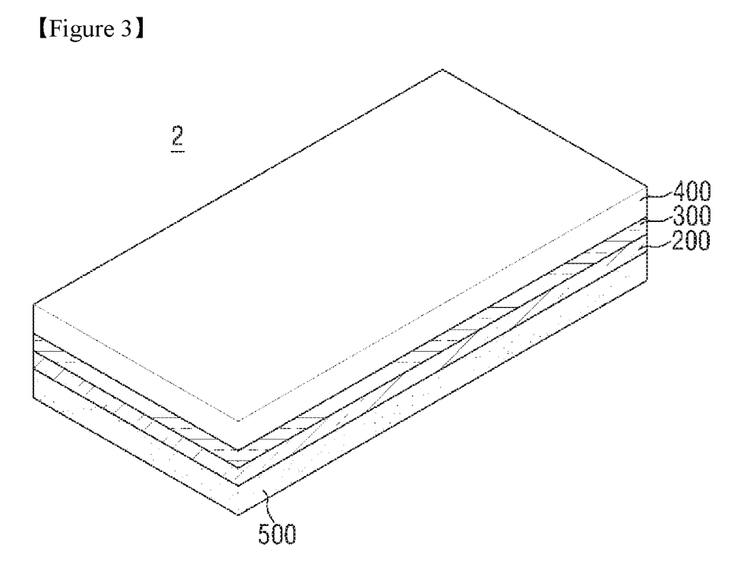
FIG. 3 is a perspective view of a polarizing plate according to another embodiment of the present invention.

FIG. 3 is a perspective view of a polarizing plate according to another embodiment of the present invention. Referring to FIG. 3, an adhesive layer 500 may be disposed on the other surface of the polarizer 200. Although not shown in the drawings, a release film may be disposed on the other surface of the adhesive layer 500 to facilitate storage and transportation of the polarizing plate. Further, the adhesive layer 500 may be used to attach the polarizing plate to a display panel described below.

In addition, although not shown in the drawings, a primer layer may be interposed between the polarizer 200 and the adhesive layer 500 to protect the polarizer 200 while improving adhesion between the polarizing plate and the display panel. The primer layer may be formed by applying a coating liquid containing a water-dispersible polymer resin, water-dispersible fine particles, and water to the polarizer 200 by bar coating, gravure coating, or the like, followed by drying.

Although not shown in the drawings, according to a further embodiment of the invention, the protective film for polarizer may be stacked on both surfaces of the polarizer, with bonding layers interposed therebetween, respectively. That is, the polarizing plate may have a structure in which the protective film for polarizer, the bonding layer, the polarizer, the bonding layer, and the protective film for polarizer are sequentially stacked and attached. Further, an adhesive layer may be disposed on a surface of the protective film for polarizer to be attached to the display panel so as to attach the polarizing plate to the display panel.

Further, although not shown in the drawings, a polarizing plate according to yet another embodiment of the invention may further include a functional layer disposed on one surface of the protective film for polarizer. The functional layer may include at least one of a hard-coating layer, an anti-reflection layer, an anti-glare layer, and a diffusion layer.

More specifically, the functional layer may be formed on one surface of the protective film for polarizer, that is, on a surface of the protective film for polarizer opposite a surface on which the polarizer is disposed. The hard-coating layer can improve heat resistance and moisture resistance of the polarizing plate and prevent dimensional change of the polarizing plate; the anti-reflection layer can reduce reflection by blocking external light incident from the outside; and the anti-glare layer can prevent glare by inducing diffusion and reflection of external light incident from the outside.

Display

Although not shown separately, the present invention can provide a display including the polarizing plate as set forth above.

The display may include a display panel displaying an image in response to signals and the polarizing plate disposed on at least one surface of the display panel.

The display may be a liquid crystal display. In this embodiment, the display may include a backlight unit in addition to the display panel and the polarizing plate. Here, the display panel may be a liquid crystal cell, which typically includes two substrates and a liquid crystal layer interposed between the substrates. One of the substrates is generally formed with a color filter, a counter electrode and an alignment layer, and the other substrate may be formed with a liquid crystal driving electrode, a wiring pattern, a thin film transistor element, an alignment layer, and the like.

In other words, the liquid crystal display includes a liquid crystal cell, a backlight unit, a lower polarizing plate interposed between the liquid crystal cell and the backlight unit, and an upper polarizing plate disposed on the viewer side of the liquid crystal cell. In addition, at least one of the upper polarizing plate and the lower polarizing plate includes the protective film for polarizer as set forth above. Preferably, the protective film for polarizer according to the present invention is disposed as the protective film for polarizer on the viewer side of the upper polarizing plate. Further, the protective film for polarizer according to the present invention may be disposed as the protective film for polarizer on the backlight side of the lower polarizing plate.

As described in connection with the polarizing plate, a functional layer may be disposed on one surface of the protective film for polarizer. Specifically, the functional layer may be disposed on one surface of the protective film for polarizer of the upper polarizing plate. That is, the functional layer may be disposed on the outermost surface of the protective film for polarizer placed on the viewer side of the upper polarizing plate.

Examples of the operation mode of the liquid crystal cell may include a twisted nematic mode and an electrically controlled birefringence mode. The electrically controlled birefringence mode may include a vertical alignment mode, an optically compensated (OCB) mode, and an in-plane switching (IPS) mode.

The backlight unit may generally include a light source, a light guide plate, and a reflective film. The backlight unit may be classified into a direct type, a side light type, and a sheet light type depending on the configuration thereof.

The lower polarizing plate may be interposed between the backlight unit and the liquid crystal cell. In this case, the polarizer of the lower polarizing plate can transmit only light that oscillates in a specific direction among light received from the light source of the backlight unit.

The upper polarizing plate may be disposed at a side of the liquid crystal cell opposite the backlight. In this case, the upper polarizing plate may be interposed between other components of the liquid crystal display, or may be placed on a surface of the liquid crystal display. When two polarizing plates are disposed with the liquid crystal cell therebetween, transmission axes of the polarizers of the respective polarizing plates may be orthogonal or parallel to each other.

The display may be an organic light-emitting diode (OLED) display including an organic light-emitting device, wherein the display panel may be an organic light-emitting display panel. The organic light-emitting display panel may include pixels. Each of the pixels may include: an OLED composed of an organic light-emitting layer between an anode and a cathode; and a pixel circuit for independently driving the OLED. The pixel circuit may mainly include a switching thin film transistor (TFT), a capacitor, and a driving TFT. The switching thin film transistor serves to charge a data voltage to the capacitor in response to a scan pulse and the driving TFT serves to control the amount of current supplied to the OLED based on the data voltage charged to the capacitor, thereby controlling the luminance of the OLED and displaying an image. Such an organic light-emitting display panel is well known in the art and will not be described in further detail.

The polarizing plate may be disposed on the viewer side of the organic light-emitting display panel. That is, the polarizing plate may be attached to a side of the organic light-emitting display panel where a viewer observes an image displayed by the organic light-emitting display panel. As a result, it is possible to prevent reduction in contrast due to reflection of light incident from the outside.

In the case of an organic light-emitting display, when a functional layer is disposed on the protective film for polarizer, the functional layer may be disposed on the viewer side of the protective film for polarizer.

EXAMPLE

Hereinafter, the present invention will be described with reference to specific experimental data.

Preparative Examples 1 to 3, Comparative Examples 1 to 2, and Experimental Example Preparative Example 1

A polyvinyl alcohol film (thickness: 60 μm, Kuraray Co., Ltd., VF-PS #6000) was subjected to swelling in an aqueous solution at 25° C., dyeing in a dyeing bath at 30° C., and stretching in a boric acid solution at 55° C. so as to have a final elongation of about 5.9, thereby preparing a polarizer (thickness: 22 μm).

Then, a PET film was subjected to melt-extrusion and simultaneous biaxial stretching to have an in-plane retardation Re of 300 nm, an out-of-plane retardation Rth of 6,800 nm, and a ratio of TD elongation to MD elongation (TD/MD) of 1.1, thereby preparing a protective film. Here, the protective film had a thickness of about 40 μm.

Then, the protective films were stacked on both surfaces of the polarizer via bonding layers each having a thickness of 2 μm to 3 μm, followed by curing through UV irradiation, thereby preparing a polarizing plate.

Preparative Example 2

A polarizer and a protective film were prepared in the same manner as in Preparative Example 1 except that the PET film was subjected to melt-extrusion and simultaneous biaxial stretching to have an in-plane retardation Re of 150 nm, an out-of-plane retardation Rth of 6600 nm, and a ratio of TD elongation to MD elongation of 1.2, followed by lamination, thereby preparing a polarizing plate. Here, the protective film had a thickness of about 40 μm.

Preparative Example 3

A polarizer and a protective film were prepared in the same manner as in Preparative Example 1 except that the PET film was subjected to melt-extrusion and simultaneous biaxial stretching to have an in-plane retardation Re of 220 nm, an out-of-plane retardation Rth of 5800 nm, and a ratio of TD elongation to MD elongation of 1.0, followed by lamination, thereby preparing a polarizing plate. Here, the protective film had a thickness of about 38 μm.

Comparative Example 1

A polarizer and a protective film were prepared in the same manner as in Preparative Example 1 except that the PET film was subjected to melt-extrusion and simultaneous biaxial stretching to have an in-plane retardation Re of 10 nm, an out-of-plane retardation Rth of 20 nm, and a ratio of TD elongation to MD elongation of 1.0, followed by lamination, thereby preparing a polarizing plate. Here, the protective film had a thickness of about 40 μm to 45 μm.

Comparative Example 2

A polarizer and a protective film were prepared in the same manner as in Preparative Example 1 except that the PET film was subjected to melt-extrusion and simultaneous biaxial stretching to have an in-plane retardation Re of 8600 nm, an out-of-plane retardation Rth of 9200 nm, and a ratio of TD elongation to MD elongation (TD/MD) of 5.0, followed by lamination, thereby preparing a polarizing plate. Here, the protective film had a thickness of about 80 μm to 100 μm.

Experimental Example 1: Measurement of Water Vapor Transmission Rate

Water vapor transmission rate of each of the protective films prepared in Preparative Examples 1 to 3 and Comparative Examples 1 to 2 was measured, and results are shown in Table 1. Calcium chloride ($CaCl_2$) was put in a moisture-permeable cup and each of the films prepared in Preparative Examples and Comparative Examples was placed on the top of the moisture-permeable cup, followed by securing the sample with paraffin. Water vapor transmission rate of the sample was found by dividing a difference between the weight of the sample before placing the sample in a thermo-hygrostat (40° C., 90% RH) and the weight of the sample after 24 hours after placing the sample in the thermo-hygrostat by a moisture-permeable area.

**Water vapor transmission rate ($g/m^2/24\ hr$)=
(Weight of sample after 24 hours (g)−Initial weight of sample (g))/Moisture-permeable area of cup ($m^2$)

Experimental Example 2: Measurement of Shrinkage

Shrinkage of each of the protective films prepared in Preparative Examples 1 to 3 and Comparative Examples 1 to 2 was measured, and results are shown in Table 1. Each of the protective films prepared in Preparative Examples and Comparative Examples was cut into a sample having a size of 60 mm×60 mm (MD×TD), followed by pretreatment at 22° C. and 55% RH for 24 hours to adjust the initial moisture content. A shrinkage rate of the sample was found by measuring the initial MD length/TD length after the pretreatment and the MD length/TD length after 250 hours after placing the sample in a thermostat (at 85° C.). The length of the sample was measured using an IM-SHGHV51I6HLD available from Keyence Corporation.

**Shrinkage rate (%)={(Length of sample after 250 hours (mm)−Initial length of sample (mm))/ Initial length of sample (mm)}×100

Experimental Example 3: Measurement of Warpage

Warpage of each of the polarizing plates prepared in Preparative Examples 1 to 3 and Comparative Examples 1 to 2 was measured, and results are shown in Table 1. Each of the polarizing plates prepared in Preparative Examples and Comparative Examples was attached to upper and lower surfaces of 0.5 T glass, followed by pretreatment at 22° C. and 55% RH for 24 hours to adjust the initial moisture content. Warpage of the sample was found by measuring the initial height of the sample after pretreatment and the height of the sample after 250 hours after placing the sample in a thermostat (at 85° C.). In addition, warpage of the sample was found by measuring the initial height of the sample after pretreatment and the height of the sample after 250 hours after placing the sample in a thermo-hygrostat (at 60° C., 95% RH). The height of the sample was defined as a median value of the height values measured at four vertices (maximum warpage position) and respective edges.

**Warpage (mm)=Height of sample after 250 hours (mm)−Initial height of sample (mm)

TABLE 1

| | Water vapor transmission rate (g/m²/24 hr) | Shrinkage rate (%) | | | Warpage (mm) | |
|---|---|---|---|---|---|---|
| | | MD | TD | MD/TD | 85° C. | 60° C./95% |
| Example 1 | 49 | −0.42 | −0.44 | 1.0 | 0.3 | 0.0 |
| Example 2 | 40 | −0.43 | −0.48 | 0.9 | 0.2 | 0.1 |
| Example 3 | 36 | −0.33 | −0.30 | 1.1 | 0.1 | 0.1 |
| Comparative Example 1 | 685 | −0.32 | −0.29 | 1.1 | 0.2 | 0.4 |
| Comparative Example 2 | 9 | −0.32 | −0.14 | 2.4 | 0.7 | 0.2 |

It should be understood that the embodiments described above are provided for illustration only and that different embodiments may be applied in combination.

The invention claimed is:

1. A protective film for polarizer, having a water vapor transmission rate of about 0 g/m²/24 hr to about 100 g/m²/24 hr; a ratio of shrinkage in the machine direction to shrinkage in the transverse direction of about 0.9 to about 1.3; an in-plane retardation Re of about 0 nm to about 350 nm; an out-of-plane retardation Rth of about 2,500 nm to about 8,000 nm; and a thickness of about 10 μm to about 60 μm, the shrinkage in each of the machine direction and the transverse direction being measured after heating the protective film for polarizer having a size of 60 mm×60 mm (machine direction×transverse direction) for 250 hours at 85° C.,
   wherein the protective film for polarizer is a polyester-based film, and the polyester is polyethylene terephthalate.

2. The protective film for polarizer according to claim 1, wherein the protective film for polarizer comprises polyester-based material.

3. The protective film for polarizer according to claim 2, wherein the protective film for polarizer comprises a polyethylene terephthalate resin, a polyethylene naphthalate resin, or a copolymer thereof.

4. The protective film for polarizer according to claim 3, wherein the protective film for polarizer has a triple co-extruded structure comprising the polyethylene terephthalate resin, the polyethylene naphthalate resin, or the copolymer thereof.

5. A liquid crystal display, comprising:
   a liquid crystal cell;
   a backlight unit;
   a lower polarizing plate interposed between the liquid crystal cell and the backlight unit; and
   an upper polarizing plate disposed on a viewer side of the liquid crystal cell,
   wherein at least one of the upper polarizing plate and the lower polarizing plate comprises the protective film for polarizer according to claim 1.

6. The liquid crystal display according to claim 5, wherein the liquid crystal display further comprises a functional layer disposed on one surface of the protective film for polarizer,
   wherein the functional layer comprises at least one of a hard-coating layer, an anti-reflection layer, an anti-glare layer, and a diffusion layer.

7. The liquid crystal display according to claim 6, wherein the functional layer is disposed on the protective film for polarizer of the upper polarizing plate.

8. The liquid crystal display according to claim 7, wherein the functional layer is disposed on a viewer side of the protective film for polarizer.

9. The protective film for polarizer according to claim 1, wherein the ratio of shrinkage in the machine direction to shrinkage in the transverse direction is about 0.9 to about 1.1.

10. The protective film for polarizer according to claim 1, wherein a sum of the shrinkage in the machine direction and the shrinkage in the transverse direction is less than 1%.

11. The protective film for polarizer according to claim 1, wherein the protective film for polarizer has the in-plane retardation Re of about 0 nm to about 350 nm and the out-of-plane retardation Rth of about 2,500 nm to about 8,000 nm after being stretched in the machine direction to an elongation of about 3.0 to about 3.5 and in the transverse direction to an elongation of about 2.5 to about 4.5.

12. A polarizing plate comprising:
   a polarizer comprising a polyvinyl alcohol resin; and
   a protective film for polarizer stacked on at least one surface of the polarizer,
   wherein the protective film for polarizer has a water vapor transmission rate of about 0 g/m²/24 hr to about 100 g/m²/24 hr; a ratio of shrinkage in the machine direction to shrinkage in the transverse direction of about 0.9 to about 1.3; an in-plane retardation Re of about 0 nm to about 350 nm; an out-of-plane retardation Rth of about 2,500 nm to about 8,000 nm; and a thickness of about 10 μm to about 60 μm, the shrinkage in each of the machine direction and the transverse direction being measured after heating the protective film for polarizer having a size of 60 mm×60 mm (machine direction×transverse direction) for 250 hours at 85° C., and
   wherein the protective film for polarizer is a polyester-based film, and the polyester is polyethylene terephthalate.

13. The polarizing plate according to claim 12, wherein the protective film for polarizer comprises polyester-based material.

14. The polarizing plate according to claim 13, wherein the protective film for polarizer comprises a polyethylene terephthalate resin, a polyethylene naphthalate resin, or a copolymer thereof.

15. The polarizing plate according to claim 14, wherein the protective film for polarizer has a triple co-extruded structure comprising the polyethylene terephthalate resin, the polyethylene naphthalate resin, or the copolymer thereof.

16. The polarizing plate according to claim 12, wherein the polarizing plate further comprises a functional layer disposed on one surface of the protective film for polarizer,
    wherein the functional layer comprises at least one of a hard-coating layer, an anti-reflection layer, an anti-glare layer, and a diffusion layer.

17. The polarizing plate according to claim 12, wherein the ratio of shrinkage in the machine direction to shrinkage in the transverse direction is about 0.9 to about 1.1.

18. The polarizing plate according to claim 12, wherein a sum of the shrinkage in the machine direction and the shrinkage in the transverse direction is less than 1%.

19. The polarizing plate according to claim 12, wherein the protective film for polarizer has the in-plane retardation Re of about 0 nm to about 350 nm and the out-of-plane retardation Rth of about 2,500 nm to about 8,000 nm after being stretched in the machine direction to an elongation of about 3.0 to about 3.5 and in the transverse direction to an elongation of about 2.5 to about 4.5.

\* \* \* \* \*